United States Patent
Jantunen et al.

(10) Patent No.: US 7,634,321 B2
(45) Date of Patent: Dec. 15, 2009

(54) METHOD AND APPARATUS FOR MULTIRADIO CONTROL IN A LIGHTNING DETECTION DEVICE

(75) Inventors: Joni Jantunen, Helsinki (FI); Jukka Reunamaki, Tampere (FI)

(73) Assignee: Nokia Corporation, Espoo (FI)

( * ) Notice: Subject to any disclaimer, the term of this patent is extended or adjusted under 35 U.S.C. 154(b) by 407 days.

(21) Appl. No.: 11/373,803

(22) Filed: Mar. 10, 2006

(65) Prior Publication Data

US 2007/0213843 A1    Sep. 13, 2007

(51) Int. Cl.
*G05B 11/01* (2006.01)
*G01W 1/00* (2006.01)
*H04B 17/00* (2006.01)
*G01R 31/02* (2006.01)
*G01R 27/28* (2006.01)
*H04M 1/00* (2006.01)

(52) U.S. Cl. .......................... 700/11; 702/4; 455/226.1; 455/556.1; 455/67.13; 324/72; 324/612

(58) Field of Classification Search .................. 702/4; 455/226.1, 556.1, 67.13; 324/72, 612; 700/11
See application file for complete search history.

(56) References Cited

U.S. PATENT DOCUMENTS

| | | | | |
|---|---|---|---|---|
| 5,291,208 A | * | 3/1994 | Young | 342/198 |
| 7,016,785 B2 | * | 3/2006 | Makela et al. | 702/4 |
| 7,117,008 B2 | * | 10/2006 | Bajikar | 455/552.1 |
| 7,200,418 B2 | * | 4/2007 | Kaikuranta et al. | 455/556.1 |
| 2003/0125019 A1 | * | 7/2003 | Bajikar | 455/420 |
| 2007/0213843 A1 | * | 9/2007 | Jantunen et al. | 700/11 |

FOREIGN PATENT DOCUMENTS

WO    WO-2004/045092 A1    5/2004

* cited by examiner

*Primary Examiner*—Albert DeCady
*Assistant Examiner*—Sunray R Chang
(74) *Attorney, Agent, or Firm*—Harrington & Smith, PC

(57) ABSTRACT

A method includes receiving information related to an operational status of at least one radiating component, and controlling an operation of a lightning detector at least partially in accordance with the information.

24 Claims, 7 Drawing Sheets

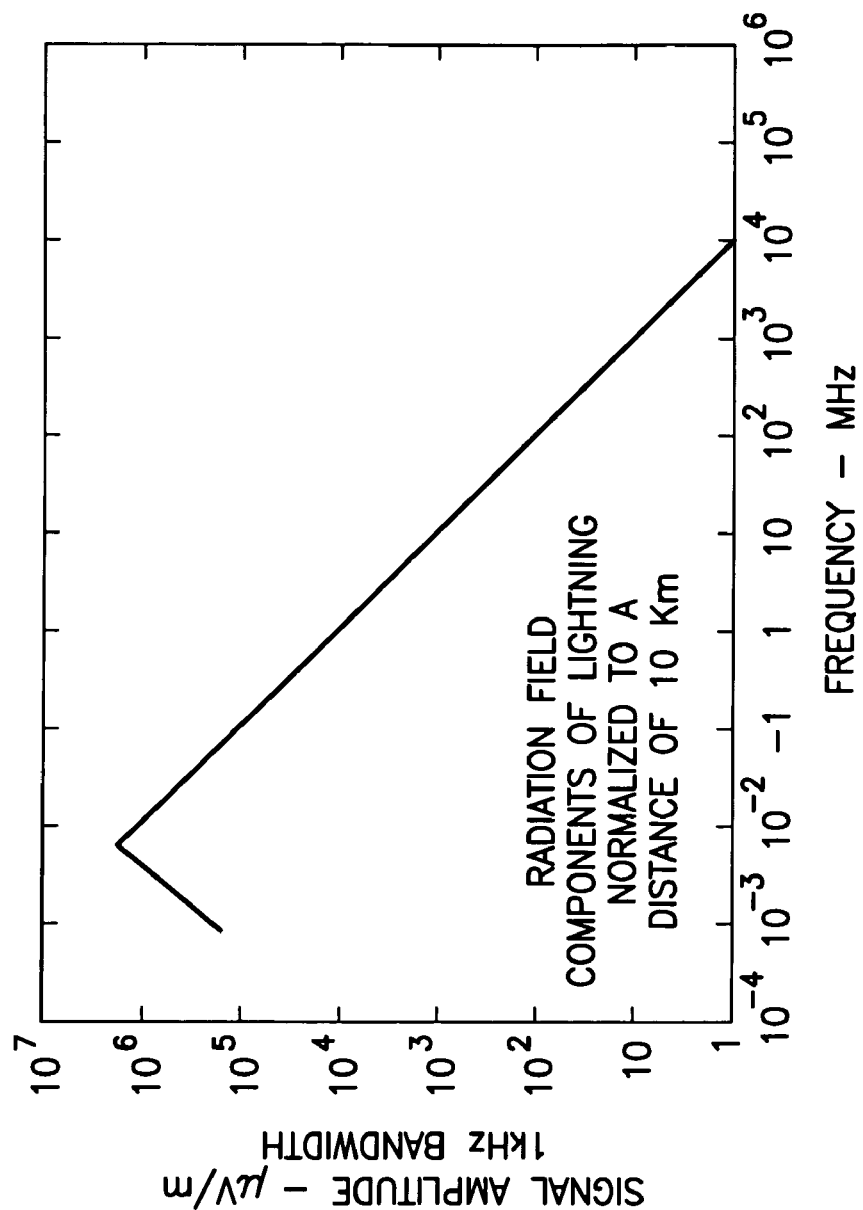

METHOD AND APPARATUS FOR MULTIRADIO CONTROL IN A LIGHTNING DETECTION DEVICE

TECHNICAL FIELD

The exemplary embodiments of this invention generally concern an apparatus and method for detecting lightning.

BACKGROUND

In present and future communication devices there are and will be, respectively, multiple radios. In such multi-radio devices, it is necessary to be aware of the internal operation and performance of all of the radios in a device in order to handle interoperability problems that may result from simultaneous operation of the radios. Usually, to avoid problems arising from interference associated with interoperability, the radios are controlled internally in a manner such that they are not operating at the same time. In addition to two-way radios, there also exist receive-only radios, such as, for example, FM broadcast radios. Because received signals in broadcast systems are often continuous, the operation of receivers cannot be controlled without causing disturbances to link quality. If other simultaneously operating radios cause interference to broadcast radios, they can be turned off or the resulting interference can be accepted.

Lightning detectors, operating to detect the electrical discharges associated with the presence of lightning strikes, may operate as continuously receiving radios. Because lightning detectors identify electromagnetic signals caused by natural lightning strokes, and the time of occurrence of the strokes is not known beforehand, it is beneficial from the perspective of detection quality to maximize the detection time. As a result, radios operating within or around the device forming the lightning detector may interfere with the operation of the lightning detector. Specifically, electromagnetic radiation emitted by other radio devices may prove difficult to discern from the electromagnetic signature of a lightning stroke.

Currently, there is no method to inform lightning detectors about the state of other radios in the device, or control other radios based on the information obtained from a lightning detector. Multiradio controllers are usually utilized to control radios based on the quality of service for each radio. However, when attempting to detect lightning, it can prove advantageous for a lightning detector to have awareness of other radios and interference generating components which are currently operating within the device so that the lightning detector can account for self generated interference.

For example, Global System for Mobile Communications (GSM) transmitters and LED drivers have been found to act as problematic sources of interference when performing lightning detection. As a result, it is difficult for the lightning detection device to identify which part of the received electromagnetic radiation is generated within the device and which part potentially originates from a lightning process exterior to the device. As the dimensions of handheld communication devices become smaller, methods utilizing shielding and filtering to attenuate interfering radiation from internal radios may prove to be insufficient. Additionally, as the transmit power levels of internal radios are relatively high, the level of spurious signals is also high within a short range from the radio independently of the carrier frequency.

SUMMARY OF THE PREFERRED EMBODIMENTS

The foregoing and other problems are overcome, and other advantages are realized, in accordance with the exemplary embodiments of this invention.

In accordance with an exemplary embodiment of the invention, there is provided a method including receiving information related to an operational status of at least one radiating component, and controlling an operation of a lightning detector at least partially in accordance with the information.

In another exemplary embodiment of the invention, there is provided a mobile device including a radio controller coupled to at least one radiating component for controlling the operation of the at least one radiating component, and a lightning detector coupled to the radio controller for receiving status information on the operation of the at least one radiating component.

In accordance with an exemplary embodiment of the invention, a program of machine-readable instructions, tangibly embodied on an information bearing medium and executable by a digital data processor, performs actions directed toward lightning detection, the actions including receiving information related to an operational status of at least one radiating component, and controlling an operation of a lightning detector at least partially in accordance with the information.

In accordance with an exemplary embodiment of the invention, an apparatus includes a means for receiving a status of at least one radio from a radio controller, a means for receiving an electromagnetic radiation signal, and a means for performing a lightning detection on the electromagnetic radiation signal utilizing the status.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 7 is a diagram of the amplitude and frequency distribution of electromagnetic energy associated with a lightning process.

DETAILED DESCRIPTION OF THE PREFERRED EMBODIMENTS

Figure 1:
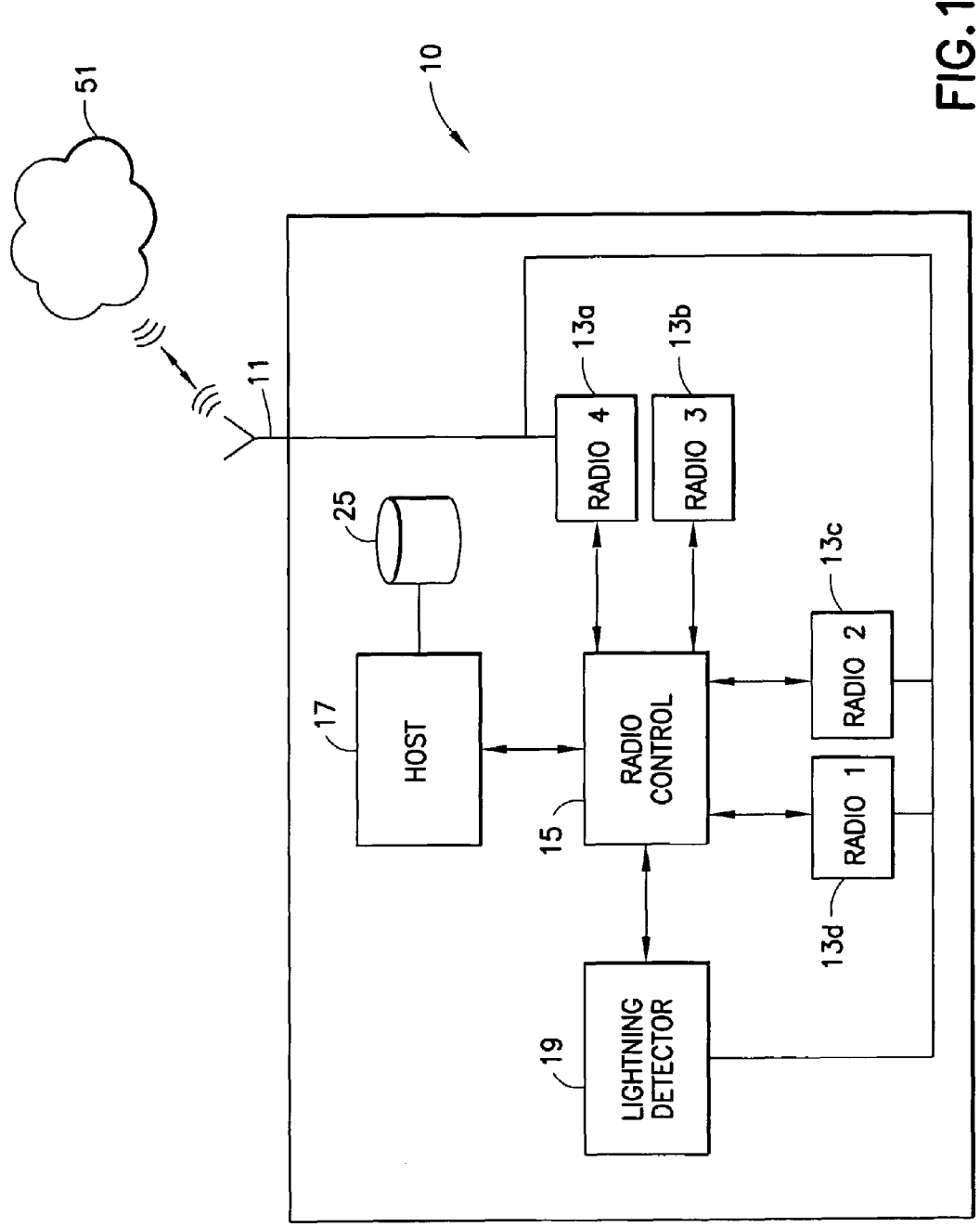
FIG. 1 is a schematic diagram of an exemplary embodiment of a mobile device for performing lightning detection according to the invention.

In exemplary embodiments of the invention, and referring to FIG. 1, status information from a radio controller 15 corresponding to the operation of active radios 13 within a device 10, such as a mobile device, is utilized to improve both the quality and efficiency of a lightning detector 19. While FIG. 1 shows four radio devices 13a, 13b, 13c, 13d, more or less than this number may be present. As explained more fully with reference to various exemplary embodiments detailed below, such status information can be utilized by the lightning detector 19 in numerous ways to improve the quality of lightning detection. For example, the status information can be utilized to proactively select times to perform lightning detection when radio interference is at a minimum. Alternatively, the status information can be utilized in real time to confirm the instantaneous presence of radio interference. Lastly, the status information can be utilized retrospectively to disregard electromagnetic radiation received during periods of time concurrent with radio interference. As used herein, "operational status" is defined to include, but is not limited to, on, off, transmission power level, band of operation, periodicity of operation, etc. for a TDMA radio, which may transmit periodically.

Alternatively, such status information can be utilized to filter out the presence of undesirable sources of electromagnetic interference when performing lightning detection, to change the mode in which the lightning detector 19 operates, or to change the manner in which radios 13 operate so as to permit more accurate lightning detection.

Still referring to FIG. 1, there is illustrated an exemplary embodiment of a mobile device 10 incorporating lightning detection according to the exemplary embodiments of this invention. In general, the various embodiments of the mobile device 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Mobile device 10 includes at least one antenna 11 for transmitting and receiving electromagnetic signals, such as to and from a network 51 to which mobile device 10 is coupled. A plurality of radio devices 13 are illustrated coupled to the antenna 11. Alternatively, one or more of the radio devices 13 can incorporate an internal antenna 11 for facilitating communications with outside entities. It can be assumed that the plurality of radios 13 are coupled to radio controller 15. As described more fully below, radio controller 15 operates to monitor and control the times at which various radios 13 are in an operative mode as well as, in some instances, controlling the manner in which the radios 13 operate. For example, radio controller 15 can instruct a radio 13 with reference to a power transmit level at which radio 13 is to be operated. While illustrated with reference to a plurality of radio devices 13 transmitting electromagnetic energy, the invention is broadly drawn to encompass any radiating component, such as a radio device 13, coupled to the radio controller 15. Such radiating components emit electromagnetic energy at a frequency typically above 100 kHz.

A lightning detector 19 may be coupled to the antenna 11 as well as to the radio controller 15. An optional host 17 is coupled to the radio controller 15. Host 17 is further coupled to radios 13 and lightning detector 19 via radio controller 15. In an exemplary embodiment, host 17 is an electronic computing device, such as a CPU, capable of accessing and executing instructions such as can be stored in a digital format on a computer readable medium either internal or external to host 17. Note that in some embodiments the functionality of the host 17 may be incorporated in the radio controller 15, and vice versa. In addition to internal memory, such as RAM, ROM, or flash memory, host 17 can be coupled to an external memory device 25.

As the structure of a lightning detector has many communalities with a radio receiver, it is also possible that the receiver part of one of the radios 13 additionally performs the task of the lightning detector 19. It can either work at times when the radio 13 is not performing its original receiving task, or it can even work in parallel. Parallel handling of the receiving task and the lightning detection may be especially easy to implement in Software radios, in which the RF processing of the radio receiver is to a great extent performed in software. In such an embodiment, one piece of software handles the digitized RF-signal for the original receiving task, and a second piece of software handles the analysis of the digitized RF-signal to detect lightning. The radio controller 15 can control the mode of operation of this radio receiver.

Figure 2:
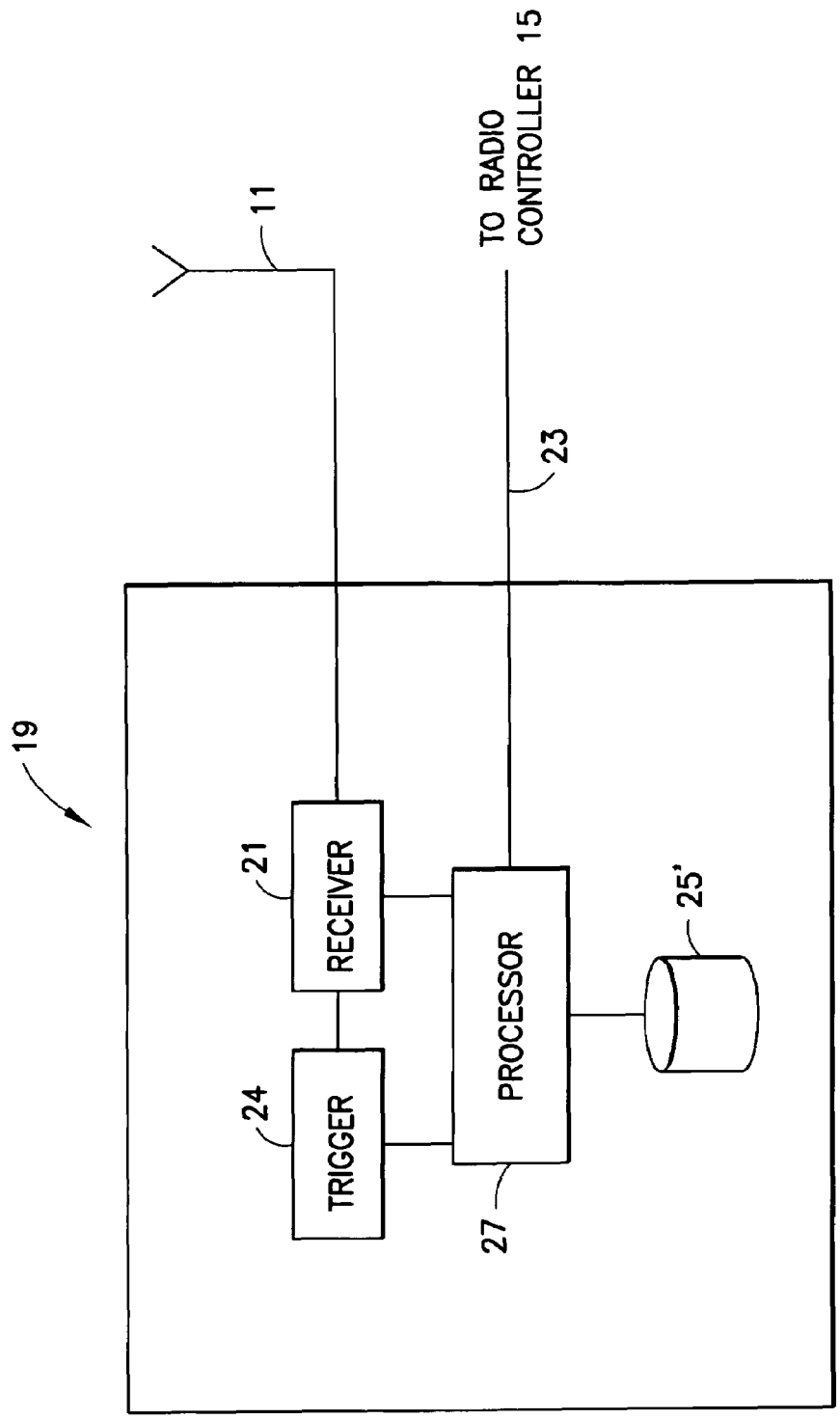
FIG. 2 is a schematic diagram of an exemplary embodiment of a lightning detector according to the invention.

With reference to FIG. 2, there is illustrated an exemplary embodiment of a lightning detector 19 that is suitable for use with the exemplary embodiments of this invention. Lightning detector 19 includes a receiver 21 for receiving electromagnetic radiation signals via the antenna 11. While illustrated as coupled to the antenna 11 of mobile device 10, the receiver 21 can be coupled to an alternative antenna, such as one specific to lightning detector 19. In the exemplary embodiment illustrated, lightning detector 19 further includes a processor 27, such as a CPU, capable of executing instructions for the purpose of detecting lightning. In one exemplary embodiment, the processor 27 performs any of a number of well known digital signal processing (DSP) algorithms, such as Fourier analysis, to isolate from the received electromagnetic radiation a signal indicative of a lightning process. Processor 27 is coupled to the radio controller 15 and receiver 21. The processor 27 of the lightning detector 19 can additionally be coupled to a memory 25'. The processor 27 is capable of accessing executing instructions such as can be stored in a digital format on a computer readable medium either internal or external to processor 27, such as memory 25'.

In operation, lightning detector 19 interfaces with radio controller 15 when operating to detect the presence of lightning. As described more fully below, by interfacing with radio controller 15, lightning detector 19 is able to obtain information on the status of the other radios 13 operating in proximity to lightning detector 19 and, as a result, more accurately account for interference arising from the operation of such radios 13.

The information on the status of the other radios 13 can be categorized. In a simple form, the categorization could be for example a) no harm, b) tolerable harm, c) intolerable harm, depending on the expected degradation of the lightning detection accuracy based on the activity of the radios 13. Depending on the assigned category, the mode of operation of the lightning detector 19 could be controlled. In the above example, the lightning detector 19 might work in a best mode in case a) and mark the detection result as "highly reliable", in case b) it may still work in a restricted mode, e.g. not continuously or only on a limited frequency band, and mark the detection results as "medium reliable", and in case c) the lightning detection may not work at all to save power, as no reliable information could be obtained. Also, other levels of reliability may be used with more or less steps.

Figure 3:
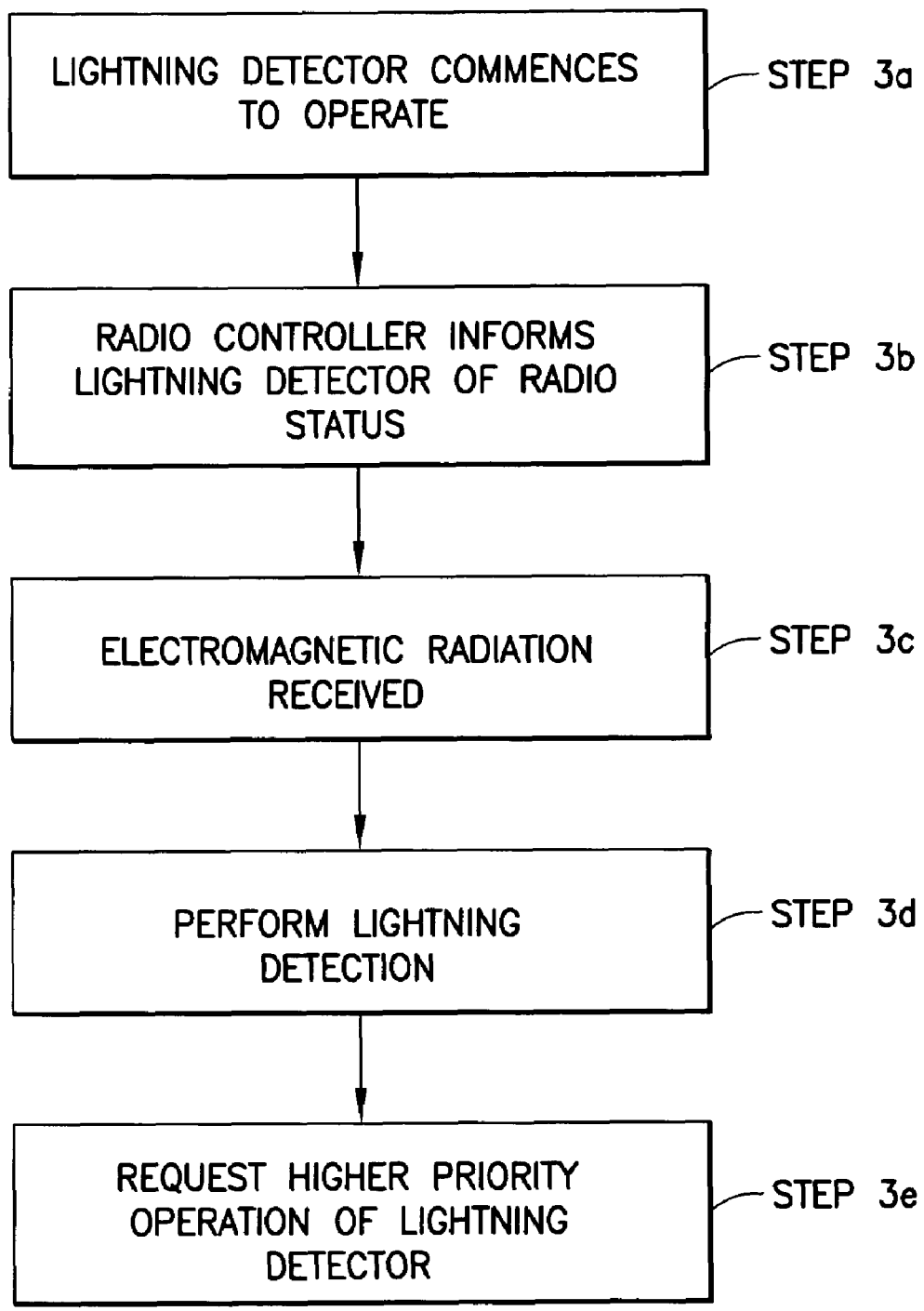
FIG. 3 is flow chart of an exemplary embodiment of a method of the invention.

With reference to FIG. 3, there is illustrated one exemplary embodiment of the invention whereby the lightning detector 19 interfaces with the radio controller 15 to detect the presence of lightning. At step 3a, the lightning detector 19 commences to operate. At step 3b, the radio controller 15 informs the lightning detector 19 of the operative status of the radios 13 including time instants, and periods, at and during which no radios 13 are operating or will be operating. In an exemplary embodiment of the invention, those time periods during which there are no radios 13 operating are preferred for receiving and analyzing electromagnetic radiation indicative of the presence of lightning. Alternatively, the radio controller 15 informs the lightning detector 19 about the times when and which radio is operating, especially transmitting. In this way, the lightning detector can generate a list of times with their related interference levels. Thus, the lightning detection unit has the possibility to detect lightning even under a certain interference level, that may still be low enough to allow lightning detection.

At step 3c, electromagnetic radiation possibly originating from a lightning process is received by the lightning detector 19. The reception of such electromagnetic radiation can be accomplished by the receiver 21. In the present exemplary embodiment, the communication of time periods by the radio controller 15 during which no radios 13 are operating can be either real-time, predictive, or both. In a real-time scenario, lightning detector 19 receives electromagnetic radiation after being informed by radio controller 15 that no radios 13 are in operation and continues to receive radiation for a period that preferably does not extend beyond a point when the radio controller 15 provides information that a radio 13 is operating. In a predictive mode, the radio controller 15 schedules the times at which radios 13 operate and informs the lightning detector 19 of times in the future when there will be no interference generated by the radios 13.

At step 3d, the lightning detector 19 processes the received electromagnetic radiation to determine the presence of a lightning process. Such processing can be performed by processor 27 and can involve any of a number of signal processing techniques to discern the presence of a lightning process. At step 3e, to reduce the effects of interference, the lightning detector 19 can communicate with the radio controller 15 to request a higher priority of operation for the lightning detector 19 as compared to the other radios 13. The assigning a higher priority of operation to the lightning detector 19 can include a deferral of the operation of radios 13 by the radio controller 15 for a period of time sufficient to allow the lightning detector 19 to receive a desired duration of electromagnetic radiation. In addition, for example, higher priority operation of the lightning detector 19 can result in the suspension, by the radio controller 15, of the operation of a radio 13 such as when the radio is involved in a relatively long duration download or similar operation.

Figure 4:
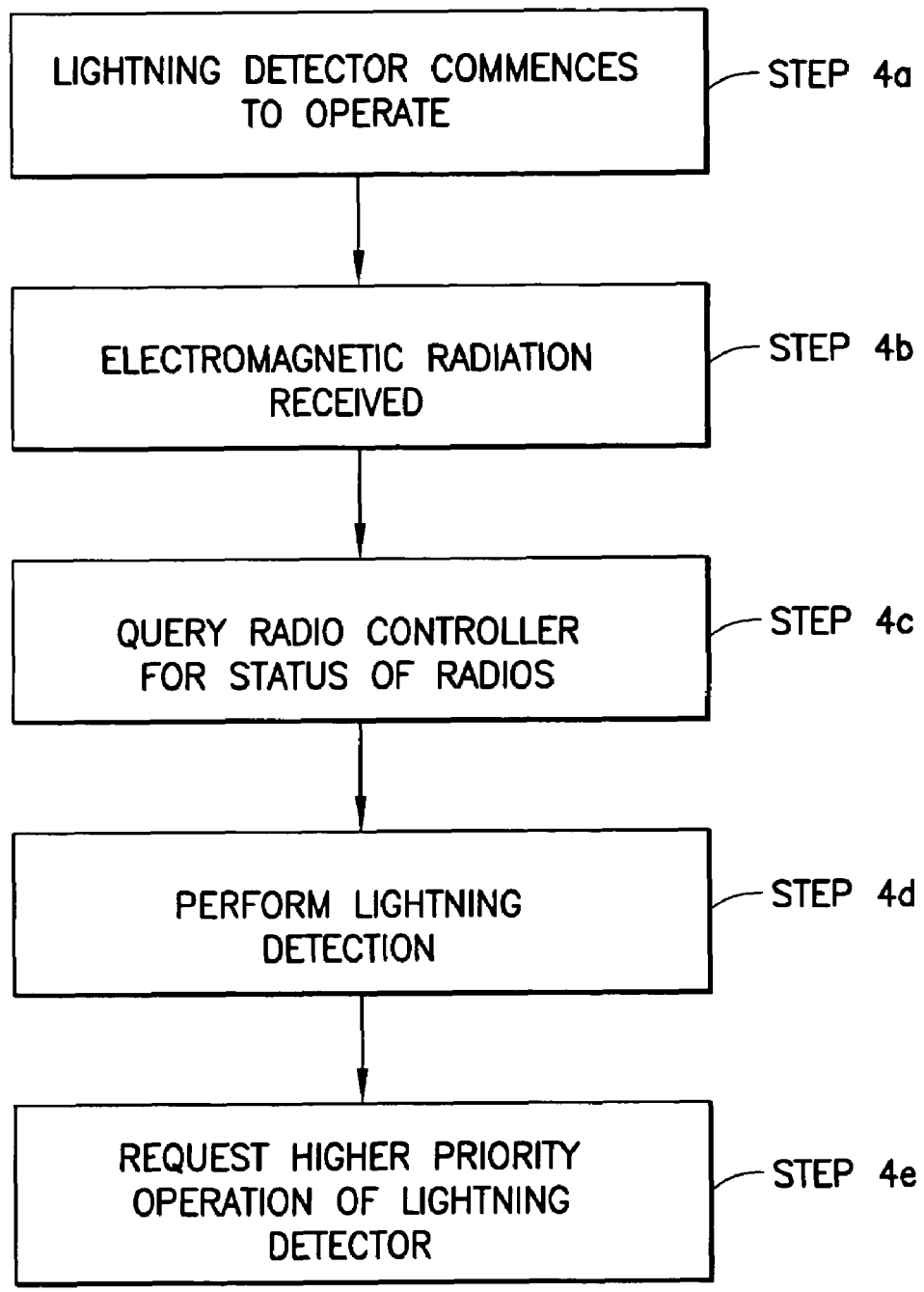
FIG. 4 is flow chart of another exemplary embodiment of a method of the invention.

With reference to FIG. 4, there is illustrated an exemplary embodiment of the invention whereby the lightning detector 19 queries the radio controller 15 for information regarding the current operative status of radios 13. At step 4a, the lightning detector 19 commences to operate. At step 4b, electromagnetic radiation possibly originating from a lightning process is received by the lightning detector 19. As noted above, the reception of such electromagnetic radiation can be accomplished by the receiver 21 via an antenna 11.

At step 4c, the lightning detector 19 queries the radio controller 15 to determine the current operative status of the radios 13. In this exemplary embodiment, the lightning detector 19 receives an electromagnetic signal and affirmatively queries the radio controller 15 to receive a present status of the radios 13. At step 4d, the lightning detector 19 proceeds to process the received electromagnetic radiation while incorporating the information regarding the operation of the radios 13 during the reception period. For example, the processor 27 can utilize the radio status information to disregard the electromagnetic radiation signal if it is known that a potentially interfering radio 13 was or is operating. At step 4e, the lightning detector 19 can communicate with the radio controller 15 to request a higher priority of operation for the lightning detector 19 as compared to the other radios 13.

Figure 5:
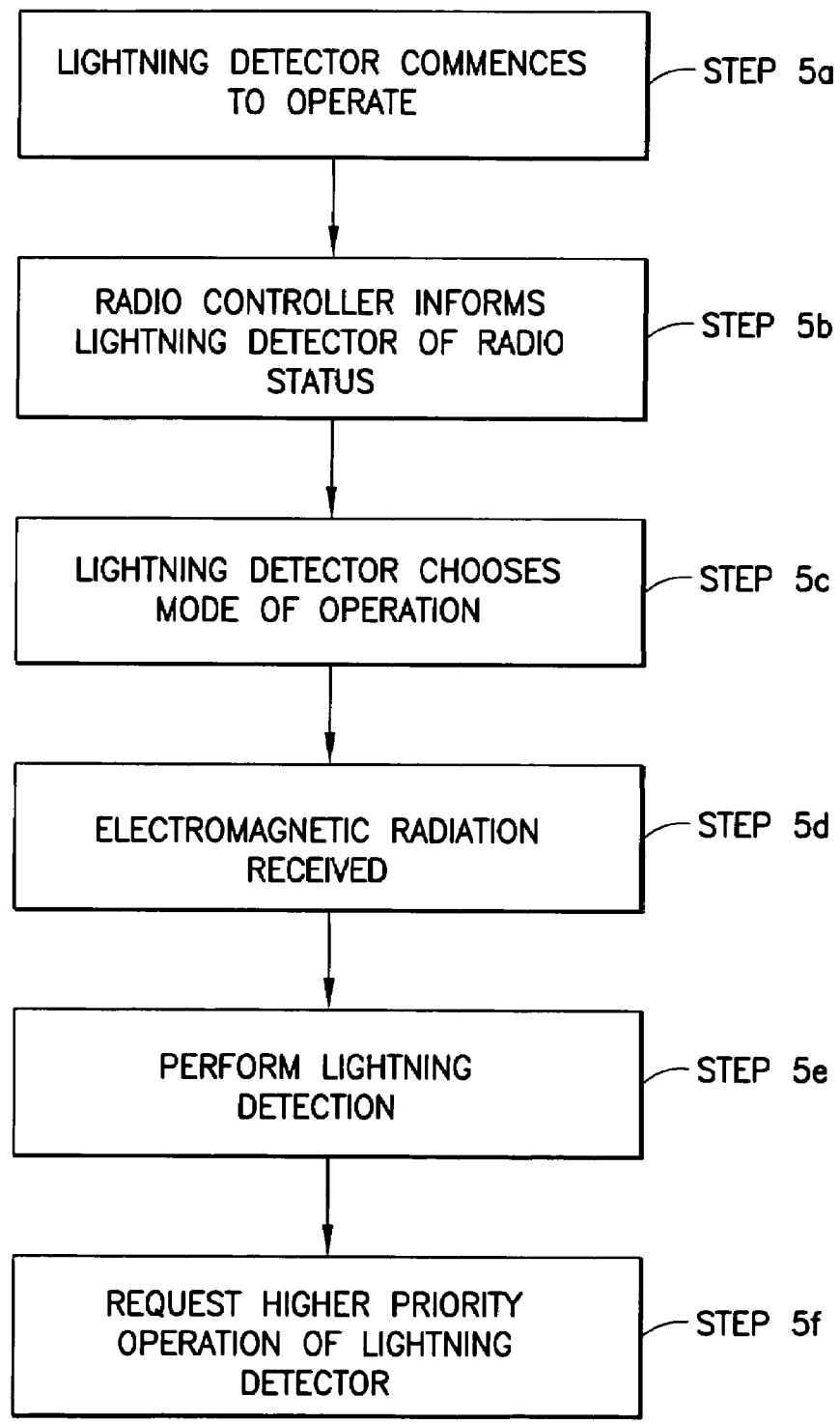
FIG. 5 is flow chart of another exemplary embodiment of a method of the invention.

With referenced to FIG. 5, there is illustrated another exemplary embodiment of the method of the invention. At step 5a, the lightning detector 19 commences to operate. At step 5b, the radio controller 15 communicates the operative status of the radios 13 to the lightning detector 19. At step 5c, the lightning detector 19 determines its own mode of operation in response to the information received from the radio controller 15 regarding the operation of radios 13. Different modes of operation for the lightning detector 19 can vary, for example, with regards to the power consumption or level at which the lightning detector 19 operates, as well as the frequency band or bands of electromagnetic radiation monitored by the lightning detector 19.

Once a mode of operation of the lightning detector 19 is determined, at step 5d, electromagnetic radiation possibly originating from a lightning process is received by the lightning detector 19. The reception of such electromagnetic radiation can be accomplished by the receiver 21. At step 5e, the lightning detector 19 proceeds to process the received electromagnetic radiation while incorporating the information regarding the operation of radios 13 during the reception period. At step 5f, the lightning detector 19 can communicate with the radio controller 15 to request a higher priority of operation for the lightning detector 19 as compared to the other radios 13.

Figure 6:
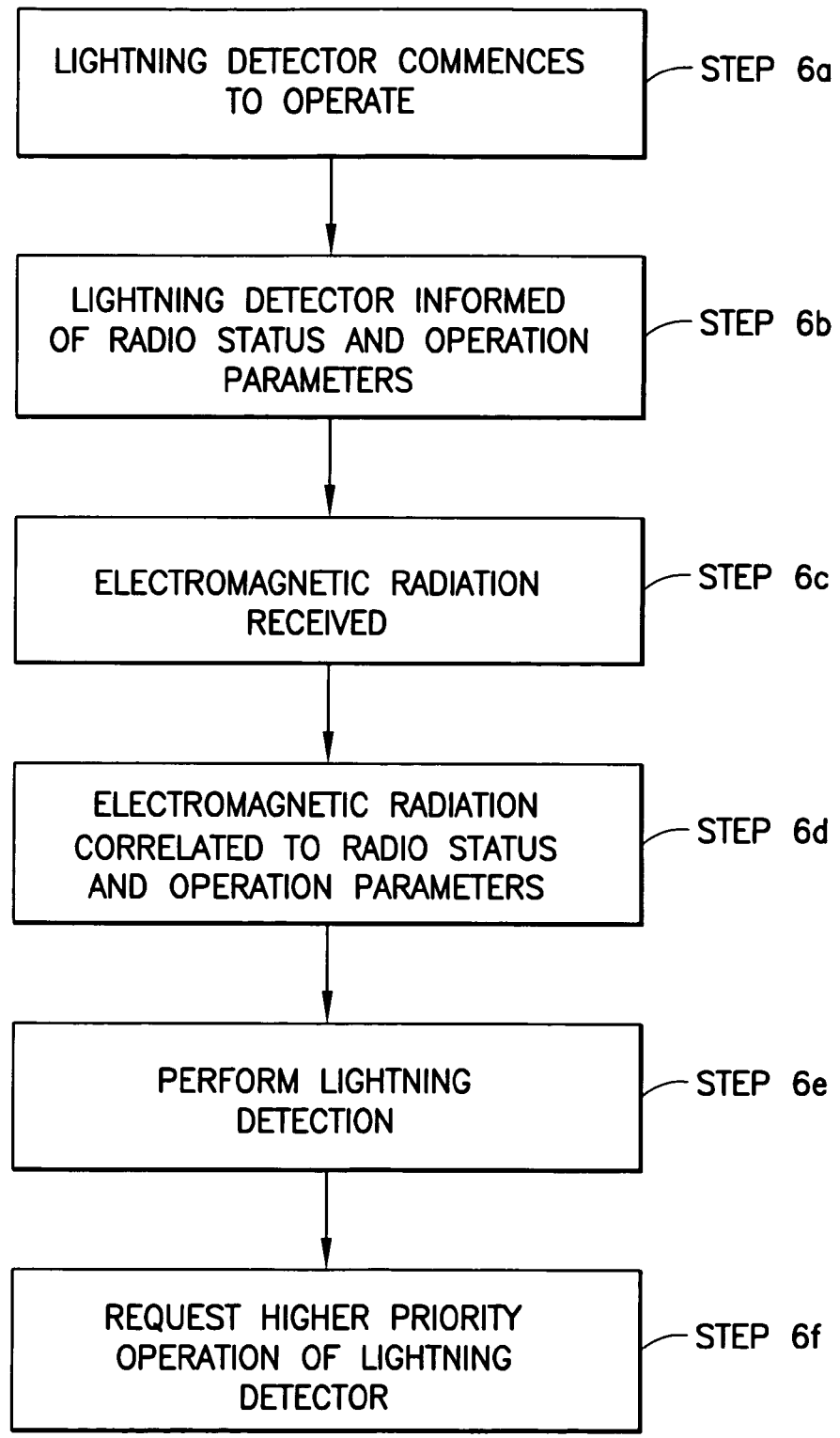
FIG. 6 is flow chart of another exemplary embodiment of a method of the invention.

With reference to FIG. 6, there is illustrated another exemplary embodiment of the method of the invention. At step 6a, the lightning detector 19 commences to operate. At step 6b, the radio controller 15 informs the lightning detector 19 about the operative status of the radios 13 including time periods when one or more radios 13 will be operating or are operating. In addition to their operative status, radio controller 15 additionally informs the lightning detector 19 of the operation parameters of the radios 13 including, but not limited to, one or more of the frequency bands and power levels at which individual radios 13 are operating.

At steps 6c and 6d, the lightning detector 19 operates to receive electromagnetic radiation possibly indicative of a lightning process and correlates the received radiation with the activity and operation parameters of the radios 13 as received from the radio controller 15. As a result of correlating and comparing the operation of the other radios 13 and the received electromagnetic radiation signal, the lightning detector, at step 6e, proceeds to determine the likelihood that any or all of the received electromagnetic radiation was the result of a lightning process. At step 6f, the lightning detector 19 can communicate with the radio controller 15 to request a higher priority of operation for the lightning detector 19 as compared to the other radios 13.

As has been illustrated with reference to the above described exemplary embodiments, the lightning detector 19 interacts with the radio controller 15 to reduce the interference with the lightning detection processes of the lighting detector 19. In addition to and in conjunction with the above described exemplary embodiments, various other steps can be taken to increase the accuracy and efficacy of the operations of the lightning detector 19.

In an exemplary embodiment, the lightning detector 19 is maintained in a low power consumption state, or sleep state, when known internal interference sources such as the radios 13 are active. In many such instances, it is possible that accurate lightning detection is unacceptably degraded as a result of the undesirable interference.

In another exemplary embodiment, if the interference arising from the operation of the radios 13 is not of a magnitude sufficient to prevent the detection of a lightning process, but only increases the noise level in the received electromagnetic signal, it is possible to optimize the active periods of lightning detection. Specifically, during tolerable interference conditions the duty cycle of lightning detection, including the reception of electromagnetic radiation and subsequent processing, is lower than during periods of time when such interference is reduced. In either case, lightning detection is possible.

As described above, the operation of the lightning detector 19 may occur during periods of radio 13 interference ranging from approximately no interference to an amount sufficient to prevent accurate lightning detection. When endeavoring to efficiently allocate power amongst the various components of the mobile device 10, including the lightning detector 19, it is possible to operate the lightning detector 19 in various modes each corresponding to a different power consumption requirement. In addition to operating the lightning detector 19 in different modes to reduce power consumption, such modes can be chosen based upon the presence of interference conditions. For example, the lightning detector 19 can operate in a less accurate but lower power mode, and in a more accurate but more power hungry mode. The lightning detector 19 can switch between such exemplary modes depending on the detected lightning originated signals, and also depending on the information from the multi-radio controller 15 or the host 17.

As noted in various exemplary embodiments described above, lightning detection capability can be improved if the operational priority of the lightning detector 19 is elevated. Such a change in priority of operation can be accomplished by the scheduling functions of the radio controller 15 in response to a request from the lightning detector 19. If, for example, the operational mode of the mobile device 10 is such that that lightning detection is prioritized, the lightning detector 19 can request the radio controller 15 to optimize the interference environment from the perspective of lighting detection in the situations where the lightning detector 19 detects signals that may have originated from a lightning process. For example, the transmission frequency can be changed, the frequency of transmissions (number per time unit) in a connection can be reduced, the power level of transmissions may be reduced, or the transmission timing may be changed by e.g. transmitting shorter bursts.

In one alternative embodiment, the lightning detector 19 continues to receive electromagnetic radiation during relatively short bursts of interference, such as from a GSM transmission. In such an instance, the radio controller 15 informs the lightning detector 19 about of periods of time during which known interference, such as from radios 13, was being generated. In response to this information, the lightning detector 19 proceeds to perform analysis on the received electromagnetic radiation whereby the portion of the signal received during times of known interference are ignored or otherwise taken into account. In such a scenario, the lightning detector 19 can operate continuously, even during times of known, and possibly periodic, generated interference.

In addition, when a known interfering function, such as from a radio 13, is active simultaneously during lightning detection, it is also possible to improve detection with additional filtering that attenuates the interfering signal. Since the radiation from a lightning process is known to exist on a wide frequency band, as illustrated with reference to FIG. 7, it is advantageous to perform lightning detection with a wide band detector. However, if one or more radio devices 13 cause interference during a detection time of the lightning detector 19, filtering may be employed to decrease the detection bandwidth during the time periods when interfering function is active. The parameters of the filtering can be selected based upon information received by the lightning detector 19 from either the radio controller 15 or the host 17. Such filtering can be implemented through the digital signal processing employed by the processor 27.

In a manner similar to the implementation of additional filtering described above, it is also possible for the lightning detector to select the frequency band or channel received or analyzed by the receiver 21 so that internal interference poses less of a problem. For example, during instances of low interference, the frequency band for lightning detection can be selected purely from the perspective of lightning detection quality. When internal interference is present, as from radios 13, the frequency band used for lightning detection can be selected from a smaller group of available frequencies. In any case, the detection band is selected according to the information from the radio controller 15 or host 17.

A problematic situation from the perspective of the lightning detector 19 arises when an interfering radio 13 operates for a relatively long period of time. Such radio 13 operation is likely to occur, for example, when downloading of a large file, such as a movie, from the network to which the mobile device 10 is coupled. During such periods of time, the ability of the lightning detector 19 to detect a lightning process can be degraded. In an exemplary embodiment of the invention, the radio controller 15 or the host 17 can access, such as from network 51, archived data corresponding to the reception of electromagnetic radiation for use by the lightning detector 19. Preferably, such data is of relatively recent origin and was recorded at a geographic location near to the position of the mobile device 10. However, some of the benefits of operating lightning detector 19 within a mobile device 10 derive from fact that lightning storms can be relegated to a relatively small geographic area and can move quickly. As a result, accessing lightning strike data from a network 51 will often times prove to be insufficient for purposes of accurately detecting lightning processes at the mobile device 10. For this reason, acquisition of electromagnetic information by the lightning detector 19 is generally preferred.

As noted above, with reference to a multi-mode operation of the lightning detector 19, the lightning detector can operate in different power consumption modes corresponding to differing accuracies in lightning detection, depending on received electromagnetic radiation. In one exemplary embodiment, with reference to FIG. 2, a trigger 24 is coupled to receiver 21 and processor 27. Trigger 24 operates to monitor the electromagnetic signal received at receiver 21. Trigger 24 can be, for example, an analog device performing peak detection on the received electromagnetic signal. When a peak in the electromagnetic signal, possibly indicative of the occurrence of a lightning process, is encountered, trigger 24 triggers an elevation in the power consumption mode of the lightning detector 19. For example, the lightning detector 19 can commence to perform, via the operation of processor 27, a more accurate and more power consuming analysis of the received electromagnetic signal.

The embodiments of this invention may be implemented by computer software executable by a data processor of the mobile device 10, such as the processor 27, or by hardware, or by a combination of software and hardware. Further in this regard it should be noted that the various blocks of the logic flow diagram of FIGS. 3-6 may represent program steps, or interconnected logic circuits, blocks and functions, or a combination of program steps and logic circuits, blocks and functions.

The memories 25 and 25' may be of any type suitable to the local technical environment and may be implemented using any suitable data storage technology, such as semiconductor-based memory devices, magnetic memory devices and systems, optical memory devices and systems, fixed memory and removable memory. The data processors 15 and 27 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

It is obvious to the person skilled in the art that different embodiments of the invention are not limited to the example described above, but that they may be varied within the scope of the enclosed claims.

What is claimed is:

1. A method comprising:
   receiving, from a controller, information related to an operational status of at least one radiating component within a device;
   determining from the information, at least one period of time at which interference between the at least one radiating component and a lightning detector is below a predefined non-zero level;
   restricting an operation of performing lightening detection, by the lightning detector, to the determined at least one period of time; and
   controlling said lightning detector in a first mode of operation, a second mode of operation, and a third mode of operation, where the first mode of operation corresponds to high reliability when the interference is below a first level, the second mode of operation corresponds to medium reliability when the interference is above the first level and below a second level, and the third mode corresponds to no reliability when the interference is above the second level.

2. The method of claim 1 where the lightning detector is a component within the device 3. The method of claim 1 further comprising requesting an assignment of a higher priority at which lightning detection is performed based on the interference.

4. The method of claim 1 comprising transitioning from said first mode of operation to at least one of said second mode of operation and said third mode of operation in response to a triggering event.

5. The method of claim 4 wherein said triggering event comprises a detection peak of an electromagnetic radiation signal.

6. The method of claim 1 wherein the information is received in response to a query sent to a radio controller.

7. The method of claim 1 wherein said information comprises at least one frequency at which said at least one radiating component is operating, further comprising selecting a range of frequencies for operation of the lightning detector exclusive of said at least one frequency at which said at least one radiating component is operating.

8. The method of claim 1 further comprising selecting a filter in accordance with the information.

9. The method of claim 1 wherein said lightning detector operates with an electromagnetic radiation signal that is an archived signal.

10. The method of claim 1 where the operational status comprises at least one of transmission power level, band of operation, and periodicity of operation.

11. An apparatus comprising:
   a radio controller and at least one radiating component; and
   a lightning detector configured to receive from said radio controller status information on the operation of said at least one radiating component;
   where the apparatus is configured to determine from the status information, at least one period of time at which interference between the at least one radiating component and the lightning detector is below a predefined non-zero level and to restrict an operation of performing lightening detection, by the lightning detector, to the determined at least one period of time; and
   where the apparatus is configured to control said lightning detector in a first mode of operation, a second mode of operation, and a third mode of operation, where the first mode of operation corresponds to high reliability when the interference is below a first level, the second mode of operation corresponds to medium reliability when the interference is above the first level and below a second level, and the third mode corresponds to no reliability when the interference is above the second level.

12. The apparatus of claim 11 wherein:
   said at least one radiating component comprises a radio configured to receive an electromagnetic signal; and
   the apparatus further comprises a processor configured to perform digital signal processing of said electromagnetic signal utilizing said status information.

13. The apparatus of claim 11 wherein said lightning detector is configured to transition from a said first mode of operation to said second mode of operation in response to peak detection of an electromagnetic signal.

14. The apparatus of claim 11 wherein said apparatus comprises a mobile telephone.

15. A computer readable medium embodying a program of machine-readable instructions, executable by a digital data processor, to perform actions directed toward operating a lightning detector, the actions comprising:

receiving information related to an operational status of at least one radiating component within a device;

determining from the information, at least one period of time at which interference between the at least one radiating component and a lightning detector is below a predefined non-zero level;

restricting an operation of performing lightening detection by the lightning detector, to the determined at least one period of time; and controlling said lightning detector in a first mode of operation, a second mode of operation, and a third mode of operation, where the first mode of operation corresponds to high reliability when the interference is below a first level, the second mode of operation corresponds to medium reliability when the interference is above the first level and below a second level, and the third mode corresponds to no reliability when the interference is above the second level.

16. The computer readable medium of claim 15, the actions further comprising requesting an assignment of a higher priority at which lightning detection is performed based on the interference.

17. The computer readable medium of claim 15, the actions further comprising transitioning from said first mode of operation to at least one of said second mode of operation and said third mode of operation in response to a triggering event.

18. The computer readable medium of claim 17 wherein said triggering event comprises a detection of an electromagnetic radiation signal.

19. The computer readable medium of claim 15 wherein the information is received in response to a query sent to a radio controller.

20. The computer readable medium of claim 15 wherein said information comprises at least one frequency at which said at least one radiating component is operating, further comprising selecting a range of frequencies for operation of the lightning detector apart from said restricted operation exclusive of said at least one frequency.

21. The computer readable medium of claim 15 further comprising selecting a filter in accordance with the information.

22. The computer readable medium of claim 15, where the operational status comprises at least one of transmission power level, band of operation, and periodicity of operation.

23. An apparatus comprising:

means for receiving a status of at least one radiating component from a radio controller;

means for receiving an electromagnetic radiation signal;

means for determining from the status, at least one period of time at which interference between the at least one radiating component and a lightning detector is below a predefined non-zero level; and means for restricting an operation of performing lightning detection, by the lightening detector, to the determined at least one period of time; and means for controlling said lightning detector in a first mode of operation, a second mode of operation, and a third mode of operation, where the first mode of operation corresponds to high reliability when the interference is below a first level, the second mode of operation corresponds to medium reliability when the interference is above the first level and below a second level, and the third mode corresponds to no reliability when the interference is above the second level.

24. The apparatus of claim 23 wherein said means for performing said lightning detection comprises a processor.

* * * * *